Dec. 16, 1952   C. W. McKEE ET AL   2,622,131
PORTABLE RAIL FLAW DETECTOR
Filed Nov. 13, 1945   7 Sheets-Sheet 1

Inventors
Chester W. McKee
Richard W. McKee
By Stone, Artman + Bisson
Attorneys

Dec. 16, 1952     C. W. McKEE ET AL     2,622,131
PORTABLE RAIL FLAW DETECTOR Filed Nov. 13, 1945     7 Sheets-Sheet 4

Inventors:
Chester W. McKee
Richard W. McKee
By Stone, Artman + Bisson
Attorneys

Inventors:
Chester W. McKee
Richard W. McKee

Patented Dec. 16, 1952

2,622,131

UNITED STATES PATENT OFFICE 2,622,131

PORTABLE RAIL FLAW DETECTOR

Chester W. McKee and Richard W. McKee, Chicago, Ill., assignors, by mesne assignments, to Teledetector, Inc., a corporation of Delaware Application November 13, 1945, Serial No. 628,146

14 Claims. (Cl. 175—183)

The subject of this invention is a portable rail flaw detector. This portable flaw detector incorporates many of the inventions and features disclosed in the co-pending patent application of Royal E. Frickey and Chester W. McKee, Serial No. 385,264, filed March 21, 1941, and this appliction is a continuation in part thereof. This appliction has become United States Letters Patent No. 2,388,683, dated November 13, 1945.

The general object of this invention is to produce a truly portable rail flaw detector. By a portable flaw detector, applicants refer to one that is complete in an overall weight of under one thousand pounds. This weight includes the frame and wheels, the magnet, the generators for producing current for the magnet, the internal combusion engine for running all generators, all the electronics equipment, paint guns, the generator for producing the three or four hundred amperes at a low voltage for the performance of the hand check operation, and track takeoff equipment. Such a portable unit has great advantages for railroads. First and foremost, such a unit may be operated entirely independently of train operation. All present rail flaw detector equipment is of such a size that it must be run to a siding in order to permit a train to pass. On those railroads with heavy traffic, existing detector cars spend more time running for sidings or in sidings than they do testing track. The portable unit, however, of the weight and type hereinafter disclosed, can be lifted off and on track immediately before and after the passage of a train. It can work almost equally well against traffic as with traffic.

The second great advantage of the portable flaw detector resides in the fact that being a hand removable unit from the rails, it does not constitute a train under railroad and union rules. Consequently, it need not have a train crew. A train crew consists of a conductor, brakeman, and flagman. All three makes of existing flaw detector equipment require a train crew in addition to the crew required to operate the flaw detector equipment. The portable flaw detector requires only a flagman in addition to the regular flaw detector crew, which in the case of applicants' flaw detector car consists of an operator and a helper.

A third advantage of the portable car resides in its comparatively low cost. A standard flaw detector car of one company today costs in excess of $100,000. Applicants' portable flaw detector car will cost under $3,000. As will appear hereinafter, applicants' portable detector car is designed to operate at a lower speed than the six to eight miles an hour testing speed of the three different makes of flaw detector cars now in use. However, the greatly reduced cost of applicants' portable flaw detector car makes it possible to provide 20 of them to one of the larger units. The lower speed of the portable unit is partly compensated for by the fact that much more testing time for an eight-hour day is possible with the portable unit than with the large unit due to the latter's having to run to sidings. The large number of portable units make possible for the same capital investment plus, of course, an additional labor cost, much more testing, with the result that these small portable units may be assigned by railroads to their own divisions, and testing, instead of occurring at yearly intervals, may proceed under direct railroad supervision at periods of 30 to 60 days. A railroad division superintendent will acquire a knowledge of the internal condition of his rails comparable to his knowledge of their external condition.

Finally, the portability of the flaw detector makes it possible to transport it by road as well as by rail. As this disclosure proceeds, it will become evident that part of the invention therein lies in the ingenuity of the applicants in utilizing equipment of high capacity for short periods of time so as to make it possible to keep down the weight. In accomplishing this end, the maximum running speed of the equipment while the flaw detection apparatus is inoperative is 18 miles an hour. This speed is obtained on level track. On a grade, it drops greatly. Where, then, it is necessary to start a testing operation one or two hundred miles from a point where the portable flaw detector car happens to be located, it is highly desirable to be able to load the flaw detector on an automobile truck and get it there at 40 or 50 miles an hour without consideration of train schedules. Applicants have designed a manual takeoff for this unit which has road wheels mounted substantially beneath the heavy equipment on the detector car, whereby one man can take the car off the track. In conjunction with this takeoff equipment, applicants have designed an automobile trailer (not disclosed herein) onto which one strong man or two of ordinary strength, can roll the detector car without assistance. The detector car has been transported on this trailer behind an ordinary automobile from Chicago to Omaha at speeds up to 70 miles an hour.

These advantages of portability have long been recognized. As a matter of fact, experimenters have set out to design portable flaw detector cars only to find that as they worked toward a successful flaw detector car, the weight got to a point where the unit was no longer portable. The Frickey and McKee flaw detector car started out as a portable unit in 1937. By 1941, when the war came on to interrupt development, the car had reached a commercial degree of effectiveness in locating fissures, but its weight had increased to several tons and it was now on two cars instead of one.

This weight problem has been encountered by all flaw detector designers, but the Frickey and McKee flaw detector car has pointed a way which alone makes possible the development of a portable detector car. In order that this way may be understood, it is fair to mention that the Sperry system, which puts several hundred amperes into a rail while performing the exploratory step, requires large and heavy generators and internal combustion engines. The system simply does not permit the construction of a portable unit that weighs under 1,000 pounds. The AAR (Association of American Railroads) system is based on several large magnets spaced along the rail from each other by several feet. A car or a plurality of cars are required to maintain these magnets at a proper distance, and in addition to this, the entire success of the AAR equipment is dependent upon locating the pick-up coil or flux responsive means many feet behind the trailing magnet in order to be entirely outside the field of that magnet. Now, the Frickey and McKee flaw detector car has emphasized the use of an air core coil in conjunction with a high gain amplifier. The greater sensitivity of the air core coil to the very weak fields around an internal fissure render unnecessary the high magnetization of the rail obtained from heavy magnet and generating equipment of the AAR system or the strong electro-magnetic field obtained by similar heavy equipment employed in the Sperry system. The result is that redesigning of the Frickey-McKee apparatus for the purpose of lightening it seemed feasible when work was instituted some years ago. The problem of spacing the pick-up coil behind the magnet still remained a major one.

The principal object of the present invention, therefore, may be said to be a co-relating of the magnet with the pick-up so that the two may be combined on a single car. This object was obtained by means of experiments extending over many months of time, and these experiments resulted in theories which we do not advance as correct for the reason that they completely negative the theories of both the Sperry and the AAR systems as advanced by their own proponents. This seems to be a logical place to present the experiments even though the present apparatus has not been described.

Figure 1:
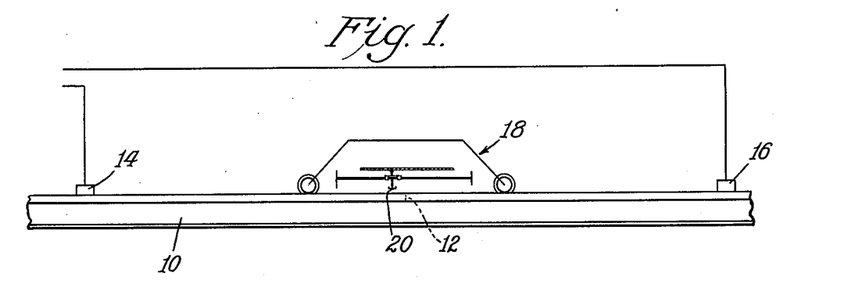
Figure 1 is a schematic illustration relating to Experiment 1.

*Experiment No. 1.*—Referring to Figure 1, a rail 10 having a fissure 12 in its ball was carefully growled by an A. C. magnet, that is to say, had an A. C. magnet passed over its surface until applicants were fairly certain that the magnetic field around the rail was of uniform strength. By uniform, applicants mean devoid of magnetic spots and with minimum strength flux fields around flaws and fissures. Shoes 14 and 16, receiving power up to 500 amperes at a satisfactory voltage, were placed in contact with the two ends of the rail 10. The Frickey-McKee analyzer 18 described in the Frickey and McKee co-pending application and shown in Figure 27 therein, was positioned astride the fissure 12 so that its pick-up 20 would be able to move back and forth along that portion of the rail containing the fissure. The pick-up 20 was connected to the cathode ray tube shown in that apparatus. The current was then turned on through the shoes 14 and 16 and what the applicants call a magnetometer was positioned at various points on the rail to make certain that there was a strong field around the rail when the current was flowing through it. This magnetometer was built by the applicants and will be explained under the next experiment. The analyzer was then turned on and the pick-up commenced to reciprocate. The cathode ray tube showed no signal. The analyzer was moved to other parts of the rail ball where there were no fissures, and no signal was received on the cathode ray tube. The sensitivity of the system was checked by the spotting coil. The only remaining possibility to explain this failure to receive a signal was the air core coil used by the applicants or the fact that the air core coil had its axis vertically positioned.

Some months later, this experiment was described to Mr. Bettison, rail fissure detector expert of the Union Pacific Railroad. The Union Pacific Railroad is the owner of a Sperry flaw detector car. Mr. Bettison stated that applicants' conclusions were correct, and that he had no explanation. He stated that this phenomenon was accidentally discovered by the Union Pacific Sperry car. Several rails were growled in the Union Pacific test track at Valley, Nebraska, and the Sperry car with no current in the brushes was moved to a position over the growled rails. Current was then turned on and the car was moved backwardly and forwardly so that the pick-up coil would traverse the fissure but never permitting either set of brushes to actually cross the fissure. No signal was received. The speed of the car could not be gotten up to operating speed in such a short distance but additional hand checks were made by moving pick-up coils over the fissure and no signal was received. The Union Pacific then re-ran the rail with the current flowing into the rail through the brushes as it does in normal testing. All of the fissures were promptly recorded on the tape. Mr. Bettison then stated that the energizing current was turned off, the car backed up and the rail re-run without any current being put in the rail at all, and the tape showed many of the fissures.

From the foregoing experiment, the applicants concluded that it was the passage of the leading brush over the ball of the rail adjacent to the fissure while current was flowing from that brush into the ball that was important. Applicants surmised that all the current did was to polarize in some way the faces of the fissure so as to leave a residual field and that all that the Sperry system does is to test a residual magnetic field just as does the AAR system or the Frickey-McKee system.

*Experiment 2.*—Frickey and McKee in designing their apparatus had placed their pick-up at various distances behind the single magnet which they had used. The closest was about seven feet but as their apparatus grew in size and weight, the magnet was moved forwardly onto a separate power car which supported the heavy gas engine and generators. In this position the pick-up was some fifteen feet behind the trailing pole of the magnet. In 1943, the AAR had issued Barnes and Keevil Patent No. 2,317,718 which contains broad claims on residual testing where the pick-up is mounted sufficiently far behind the trailing pole of a magnet so as to be substantially clear of any fields created by this magnet. This patent and other patents issued by the AAR indicated that successful testing by the residual magnetic field method was only possible where the pick-up was positioned out of the effective range of the trailing pole of the trailing magnet. This was a somewhat new thought to Frickey and McKee and became the subject of study by the present applicants, for they had all assumed that after the trailing edge of a magnet left a given portion of the rail, particularly of a magnet having two poles going down to the rail, the rail would be residually magnetized only and the presence of the energizing magnet would not affect the strength of the field only a few inches behind that pole.

This led to Experiment No. 2 which involves a magnetometer designed by applicant Chester W. McKee and schematically illustrated in Figure 2 of this disclosure. It consists of a pair of pole pieces 22 and 24 positioned with their poles adjacent to the rail 26. A rotatable armature 27 is positioned between the other ends of the pole pieces and leads are connected to a millivoltmeter 28. The rotatable armature 27 is driven by a motor 29 at a constant speed. The armature 27 rotating in the field provided by the flux from the rail passing through pole pieces 22 and 24 generates a voltage which is registered by the millivoltmeter 28. The voltage developed is directly proportional to the flux around the rail. No claim is made to this so-called magnetometer. It is described here simply to show how certain measurements of flux intensity were made. The magnetometer is generally identified by the numeral 30.

Figure 2:
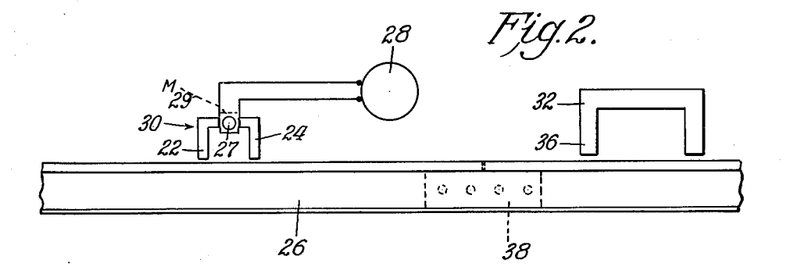
Figure 2 is a schematic illustration relating to Experiment 2.

Applicants then placed an electromagnet 32, schematically shown, above the rail 34. The magnetometer was positioned on the rail at approximately three feet therefrom. The rail had been carefully growled. The armature 26 was rotated and the millivoltmeter did not register, indicating that the flux around the rail ball was negligible. The electromagnet was then energized and the voltmeter promptly showed a reading. The magnetometer 30 was then moved toward the electromagnet 32 and the reading of the voltmeter 28 steadily rose. It was next moved away from the magnet and at a point approximately six feet from the pole 36 of the electromagnet 32, the voltmeter ceased to register. That the energization of the magnet tremendously increased the flux field around the rail ball on either side of the magnet could not be doubted. Applicant, Richard McKee, thought that the drop in strength should occur inversely proportional to the distance from the magnet, but the magnetometer readings did not substantiate this. However, the magnetometer is a somewhat imperfect instrument.

The next question that presented itself related to the effect of a rail joint positioned between the magnet and the magnetometer, for if the rail joint had the effect of substantially negativing the strength of the field, this would control the distance that the pick-up could be placed away from the electromagnet and still obtain the benefit of this "lateral sustained field." The test was repeated across a rail joint 38 which is indicated in dotted lines in Figure 2. It was found that the rail joint affected the strength of the field in the rail 26 only negligibly. The residual sustained field was maintained through the joint bars of the rail joint 38 almost as effectively as in a continuous rail ball. The magnetometer 30 ceased to register about five feet from the pole 36 of the electromagnet 32. The test was repeated over other joints and it was not found that ordinarily tight joints yielded appreciably different results. It will be understood that the electromagnet 32 will affect the strength of the trailing sustained field directly with its strenth. The test was then clinched by mounting the magnet and the magnetometer on a car and moving the two over a growled rail with the magnetometer positioned at various distances behind the electromagnet. It was concluded that the results of the experiment when the magnet was moved along the rail were substantially the same as when the magnet was stationary.

As new terminology seemed necessary, the sustained field on either side of the outside magnet is called the "lateral sustained field." Where the magnet is moving along a rail, the lateral sustained field in advance of the magnet is called the "leading sustained field," and the lateral sustained field following the magnet is called the "trailing sustained field."

*Experiment 3.*—It should not be forgotten that all of these experiments were performed with an air core coil and the results obtained are based on this fact excepting where iron core coils are specifically mentioned. Applicants then mounted their pick-up about 20 inches behind the magnet. This distance being selected as the closest distance which would permit the positioning between the magnet and the pick-up of a car wheel. The experiment which is now to be described was performed after the portable flaw detector car had been built and was in almost the form hereinafter described. The experiment was performed in the Union Pacific yards at North Platte, Nebraska. The car was run onto a switch track (which had never been tested) with the electromagnet on and the pick-up connected to a pen writing tape unit. It was found that the pen wrote a much more decisive signal for an internal defect such as a flaw than it did for surface defects such as burns, shells (half-moon, mashed down sections on the gauge side of the rail), and flows (outwardly extending lips on the field side of the rail ball). This observation was substantiated by backing the car over the rail tested and re-running it with the electromagnet off. Under these circumstances, the pen wrote almost continuously non-informative, equal amplitude signals due to the large number of burns, shells and flows, these being old rails in a yard.

Applicants concluded that testing the trailing sustained field not only made it possible to use a less strong magnet, or an amplifier of lower gross gain, thereby reducing the power equipment necessary for such apparatus, but also concluded that the trailing sustained field had a damping effect on surface defect flux fields while not impairing the strength of the internal defect flux fields.

Figure 3:
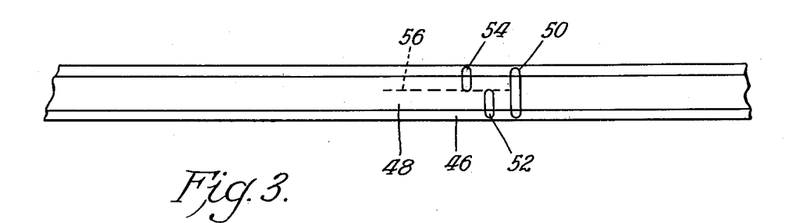
Figure 3 is a schematic illustration relating to Experiment 4.

*Experiment No. 4.*—The problem of segregating burns, shells and flows, however, remained, for a mark on the tape should not be overlooked unless a visible surface defect is seen to account for it. The shells are all on the gauge side of the rail and the flows are on the field side while the burns are usually on the high point of the rail, namely, the center, although this is not always true. In order to assist the helper and the operator, it was decided to add two separate pickups behind the main air coil pick-up and to connect each of these two pick-ups through a separate amplifier to a separate pen, which pen, is operating on the same tape as the pen actuated by the air core coil. This arrangement is not to be confused with the multiple coil pick-ups now in use wherein the pick-ups are hooked in series through a single amplifier to a single pen. Nor, with such a multiple pick-up in combination with a separate rail joint pick-up operating through a separate amplifier to a separate pen. In Figure 3, 46 identifies a rail having a ball 48. The loop 50 identifies applicants' air coil pick-up, while the off-center loops 52 and 54 identify two pick-ups which are positioned over the gauge and field sides of the rail respectively and extend perhaps 60% of the width of the rail so that each slightly overlaps the longitudinal median line 56 of the rail.

With the foregoing general principles as fundamental, applicants set out to design light equipment which nevertheless had such capacity as to function successfully a rail flaw detector system. The first specific object of this invention is to design a magnet of high flux capacity which would growl the rail simultaneously with impressing the rail with a trailing sustained field. Testing a rail which is magnetically neutral is easier than testing one which has been magnetized many times by either or both the current system or the residual magnetic system. A growler is an A. C. magnet which by repeatedly reversing the polarity of the molecules in the rail ball, eliminates any polarity set which they may have taken. Applicants thought that by utilizing the three pole reversed polarity arrangement shown in Brace Timken Bearing Testing Apparatus, Patent No. Re. 21,927 and by positioning the reversed poles close together, they would eliminate a certain amount of flux irregularity in the rail in the same manner if not to the same extent as does an A. C. growler. This magnet requires less than four amperes at 115 volts and will be described hereinafter with particular mention of the wider air gap between its central pole and the rail than the air gap between its two terminal poles and the rail. Attention will also be brought to the important fact that the central portion of the magnet serves to create a polarity complex at the point of juncture between the two end poles, which are of like polarity but which are actually opposite ends of the same metal core.

The second specific object of this invention is to provide a D. C. generator of minimum weight for performing the hand check operation on a rail suspected to have a flaw in it. This operation can usually be performed in about one minute and it requires about 300 amperes at a very low voltage. A solicitation of bids from generator manufacturers, regardless of cost, resulted in an offer of a generator having a weight of approximately 125 lbs. This weight was out of the question, and applicants have designed a generator having mica and glass insulation and silver soldered contacts which will withstand a heat up to 1100° F. without breakdown and which will not attain this heat for a period of two minutes. This generator has a gross weight of slightly under 30 lbs.

Another object of this invention is to provide a simplified manual take-off for the flaw detector. The take-off hereinafter disclosed consists of two wheels mounted beneath the heavy or motor side of the car with arms extending over to the other side of the car. By a simple arrangement with one man on each arm, and with the car on a track having a conventional roadbed, these wheels may be dropped down and then by a simple lifting action the car may be rolled off the rails.

Another object of this invention is to simplify the controls and eliminate operating the tape at a speed proportional to the rate of speed of the car along the rail. A feature of this invention is the provision of a rheostat between the source of power and the traction motor and of a shunt having a switch therein around the rheostat. When testing track, power is through the rheostat by way of the switch to the traction motor and with slight adjustments of the rheostat can be made to operate the car at approximately three miles an hour regardless of grade. When it is desired to back over the rail without testing or to run along the rail, the switch is thrown so as to shunt the current directly from the generator to the traction motor, whereby the car will run at a speed of perhaps 15 miles an hour. This ordinarily occurs at a time when the magnet is turned off. Having just one speed forward for testing, it is unnecessary for the tape motor to run at a speed proportional to the rate of travel along the rail. This eliminates certain complicated apparatus employed in the Frickey-McKee detector car or cumbersome mechanical connections between a car wheel and the drive means for the tape unit.

The amplifier is not described in this application nor is the suction driven analyzer. While their construction is different from the corresponding units in the Frickey and McKee application, S. N. 385,264, they perform the same ultimate functions.

The embodiment of the invention is illustrated in seven sheets of drawings wherein.

This application assumes a knowledge of the essentials of rail flaw detecting. The exploratory locating and handchecking steps will not be described nor will the essential features of operation or of the apparatus. Before going into the features of the invention, it would seem best to show the operability of the car as a whole and hence reference is made to Figure 4 which is a schematic wiring diagram.

General operability of the car

Figure 4:
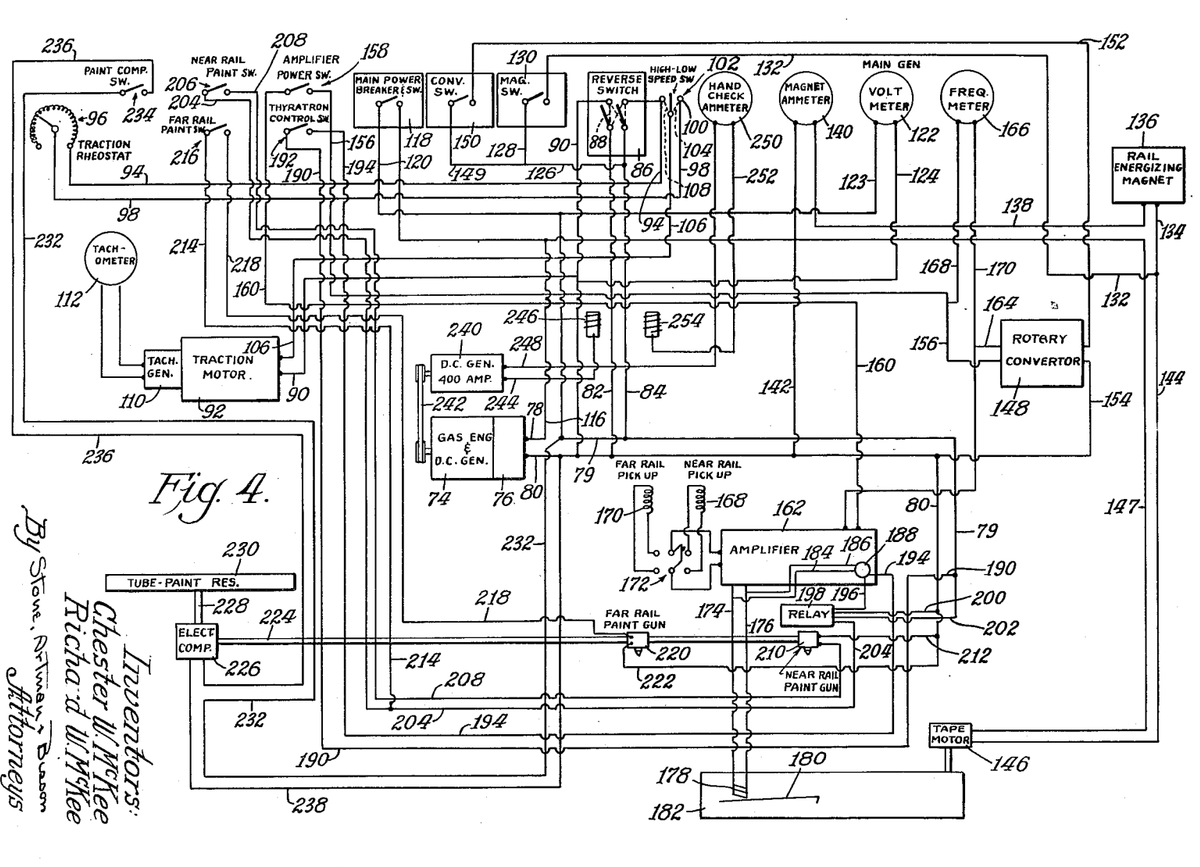
Figure 4 is a schematic wiring diagram of the electrical equipment and electrical connections on the car.
Figure 5:
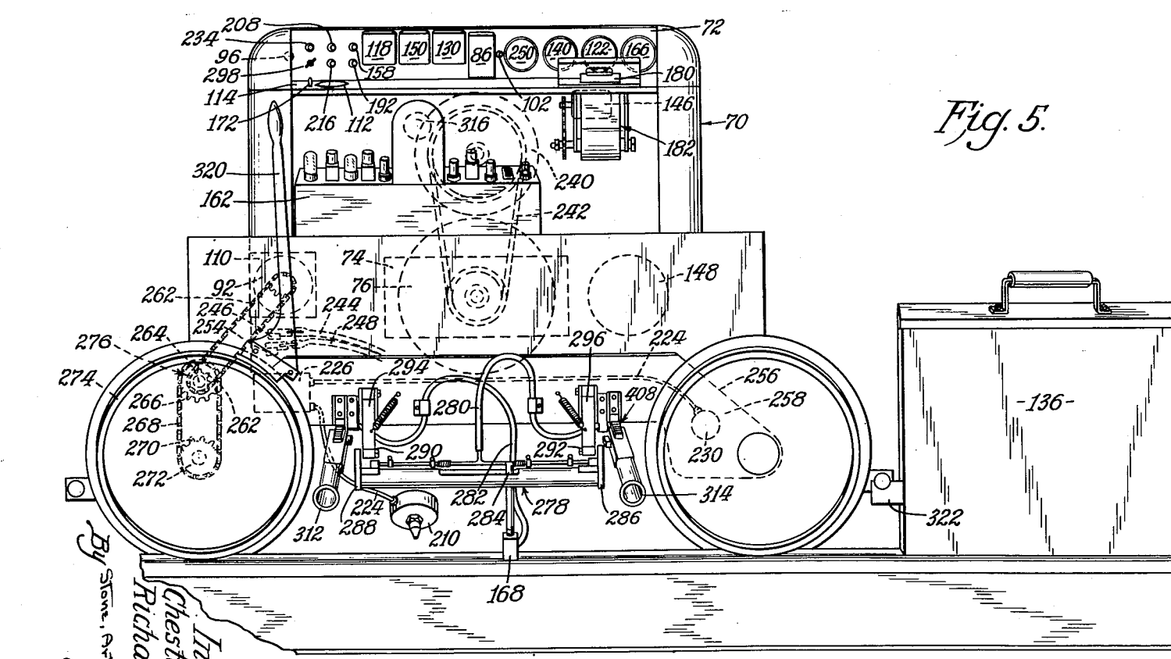
Figure 5 is a side view in elevation of the car.

Referring to Figure 5, the rail flaw detector car is generally identified by the numeral 70 and has an instrument panel 72, which, referring to Figure 4, is elongated so as to make it easier to at least schematically show the various controls and their electrical connections to the sources of power and device functions. Continuing to refer to Figure 4, the numeral 74 identifies an internal combustion engine drivingly connected to a 115 volt, 2 kva. capacity D. C. main generator 76, which supplies all current used on the flaw detector car excepting that used for the hand check shoes.

The conductor 78 leads by conductor 116 to one pole of a main power switch and overload breaker 118 which in closed position is connected by conductor 120 to the conductor 79. A voltmeter 122 is connected by conductors 123 and 124 through the breaker 118 to 78 and 80.

Conductors 82 and 14 lead to a reversing switch 86. When the switch arms are connected as indicated by dotted lines 88, the conductor 82 is connected by conductor 90 to one pole of the traction motor 92. The other conductor 84 is connected through conductor 94 to the traction motor rheostat 96, thence by conductor 98 to pole 100 of a high-low speed switch 102. When the high-low speed switch 102 is in the position indicated by the dotted line 104, the circuit is connected through the conductor 106 to the other pole of the traction motor. The speed of the traction motor can therefore be controlled by the traction rheostat 96. This is the low speed connection for the traction motor. When the switch 102 is in dotted position 108, the conductor 84 is directly connected to the conductor 106 so as to shunt the traction rheostat 96. By this circuit, the traction motor will operate at maximum speed available from the main D. C. generator 76. The speed of the gas engine is not controllable from the instrument panel. The gas engine controls are designed to function it at a constant speed insofar as possible.

By reversing the electrical connections of the conductors 82 and 84 through the reversing switch 86, the polarity of the conductors 90 and 106 will be reversed, and will reverse the traction motor. The cutting in or out of the traction rheostat 96 by the high-low speed switch 102 will not be affected. The traction motor has mounted thereon a tachometer generator 110 which operates a tachometer indicative of the speed of the apparatus along the track and which is located on the work table 114 in front of the instrument panel.

The rail energizing magnet and the motor for operating the pen and tape unit are on the same circuit because it is desirable not to energize the magnet until the car has picked up from stop position to a selected speed of from two to three miles an hour. This circuit is shown as commencing with a conductor 126, tapped off 84, connected by conductor 128 to the magnet switch 130. By closing this switch 130, the circuit continues by conductor 132 to the conductor 134 to the rail energizing magnet 136, thence by conductor 138 through the ammeter 140 and conductors 142 and 80 to the other side of the main generator 76. The conductor 132 is tapped by the conductor 144 which connects through the tape motor 146 and conductor 147 to the conductor 142.

The rotary converter is designated by the numeral 148 and its circuit commences with the conductor 149 tapped from 126 leading to the converter switch 150. This switch can close the circuit through the conductor 152, the rotary converter 148, and the conductor 154. The output of the rotary converter is connected by conductor 156 to an amplifier power switch 158, which in closed position energizes the conductor 160 leading to one side of the amplifier 162. The amplifier is connected to the other side of the rotary converter by the conductor 164. A frequency meter 166 is tapped by conductors 168 and 170 to the conductors 156 and 164.

The near-rail pick-up 168, which identifies the pick-up mounted on the rail underneath the operator's seat, and the far-rail pick-up 170 are connected to a double pole, double throw, switch 172, which provides connections to the amplifier, which contains a single amplification circuit so that only one of the two rail pick-ups may be connected thereto at one time. This double pole switch 172 is shown out of correct physical relationship with the instrument panel in Figure 4. In fact, it is positioned immediately adjacent to the tachometer on the work table, as may be seen in Figure 5.

Returning to Figure 4, the output of the amplifier 162 is connected by conductors 174 and 176 to an electromagnetic biasing means 178 for functioning a pen 180 engaging a tape 182 moved by the tape motor 146.

The output of the amplifier 162 is also tapped by the conductors 184 and 186 leading to the grid of a thyratron tube 188. The plate circuit of this thyratron tube is in a circuit stemming from the main generator. Commencing with conductor 79, a conductor 190 leads to a thyratron control switch 192, which when closed energizes conductor 194 leading to the plate circuit of the thyratron 188. When the thyratron 188 is rendered conductive by a signal from the amplifier, the conductor 194 is connected by the tube through conductor 196 to a relay 198 which is closed and connected to the other side of the main generator. When the relay 198 is closed a circuit commencing again with conductor 79 and continuing through conductor 202 is closed to conductor 204 which leads to the near-rail paint switch 206. When the near-rail paint switch 206 is closed, it energizes conductor 208, which in turn actuates a solenoid in the near-rail paint gun 210 which is connected to the other side of the main generator by the conductor 212. On the other hand, if the near-rail paint gun switch 206 is open and the relay 198 is closed, a circuit from conductor 204 through conductor 214 may be completed to the far-rail paint gun switch 216. When this switch 216 is closed, it energizes conductor 218 which actuates a solenoid in the far-rail paint gun 220, which is connected to the other side of the generator by conductor 222. A single relay operated from the thyratron is used to actuate either paint gun.

The pressure in the paint guns 210 and 220 is made through a conduit 224 from an electric compressor 226 receiving fluid by conduit 228 from a paint reservoir 230. The electric compressor 226 is operated off the main generator by a conductor 232 leading through a paint gun switch 234, which when closed, energizes the conductor 236, connecting through the electric compressor 226 by conductor 238 to conductor 80.

The hand check step is performed by a 400 ampere, 320 watt D. C. generator, which will be more specifically hereinafter described. In Figure 4, the D. C. generator 240 is driven by a belt 242 from the gas engine 74. One side of the output of the hand check generator 240 leads by conductor 244 to a rail ball shoe 246, which is conventional in that it consists of alternate laminations of iron and copper around which are three or four turns of the conductor 244. The turns magnetize the iron laminations so as to hold the shoe tightly to the rail while the copper laminations introduce the current to the rail. The other pole of the hand check generator 240 is connected by the conductor 248 through the hand check ammeter 250 and the conductor 252 to the second rail ball shoe 254.

*Disposition of parts*

The principles controlling the disposition of the parts on the car frame are these: firstly, the weight is to be concentrated over the wheels on one side of the car; secondly, the more delicate apparatus including the instrument panel and the amplifier are to be positioned away from the operating equipment so that noise from such equipment will be as remote as possible from the operator; thirdly, the operator is to be seated sidewise of the car's direction of motion so that he can glance forward or backward equally well, the present system contemplating that with one operator, only one rail will be checked at a time and that it will be the rail away from the operator's seat so that he can look diagonally down at it either in front or behind the car.

With these principles in mind, and referring to Figure 5, a side frame for the car 256 is connected to a similar frame on the other side by tubular cross members such as 258. Tubular cross member 258 is used as the paint reservoir 230 and is connected by the conduit 224 to the paint gun compressor 226. The paint gun compressor feeds the near-rail paint gun 210 by conduit 224.

The traction motor 92 weighs about 25 pounds. Applicants were unable to find any standard D. C. motor having an appropriate gear reduction for operating the car. The motor actually used is a Thor D. C. one-inch capacity electric drill motor having a built-in gear reduction of one hundred to one. The motor operates at a normal speed of 12,000 and its drive shaft turns at 120 R. P. M. This motor as available on the market is uni-directional and it was necessary to disassemble the motor and rewind the field so that it could be reversed. The motor is drive-connected by chain 260 to a sprocket 262 on a main drive shaft 264 mounted on one side of the frame. Mounted on each end of the drive shaft 264 is a sprocket such as 266 which by a chain 268 drives a similarly sized sprocket 270 on the rotatable stub shaft 272, to which is keyed a wheel 274.

A Bakelite bushing for insulating purposes is placed between the sprocket 270 and the shaft 272 and a similar bushing is positioned between the sprocket 262 and the shaft 264. The numeral 276 identifies a positive acting clutch which is used in those comparatively rare cases where it is desired to tow the car along the rail by some other power unit. Unless there existed some means for disconnecting the traction motor from the wheels, the high gear reduction in the traction motor would be damaged by rotating the traction motor from the wheels.

The pick-up 168 is suspended from a suction driven analyzer 278. Flexible tubes 280 and 282 are connected to the exhaust manifold of the gas engine 74 with the result that the carriage 284 may be reciprocated back and forth along the rail. This analyzer performs exactly the same construction as the analyzer described in the copending Frickey and McKee application, Serial No. 385,264, but it is very much lighter. It will not be described or claimed here, but it is sufficient to say that its operation is very analogous to the ordinary automobile windshield wiper. However, the analyzer is mounted on a pair of arms 286 and 288 pivotally fastened at points 290 and 292 to depending supports 294 and 296 depending from the side frame 256. The entire analyzer frame may be raised or lowered manually, excepting that there is a like analyzer on the far-side of the car and this analyzer can be raised or lowered by means of a flexible shaft which has an operating handle 298 on the instrument panel 72.

Figure 6:
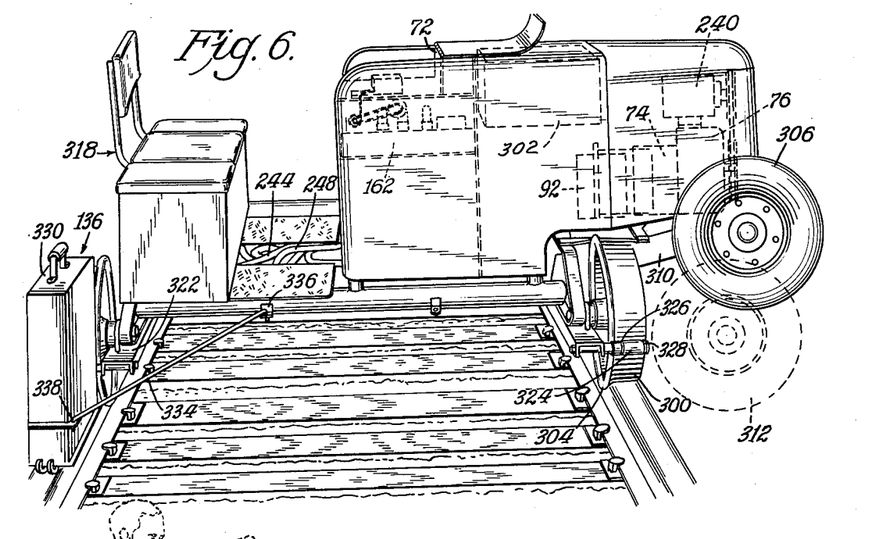
Figure 6 is a perspective view of the front side of the car.

Referring now to Figure 6, the traction motor 74, main generator 76, hand check generator 240, rotary converter 148 and traction motor 92, are disposed slightly outside a vertical line passing through the wheel 300. A fuel tank 302 will of course vary in weight depending upon its contents and it is positioned slightly to the left of the vertical line through the wheels 300. The arrangement of the apparatus is such that the combined weight to the left of the wheel 300 is greater than the weight to the right of the wheel. In operation on a track, of course, this difference is accentuated by the operator's being on the seat and the magnet 136 being in position.

With the weight thus disposed, it is evident that a great deal of lifting strength on the left-hand side of the car as viewed in Figure 6 would not be necessary to pivot the load on the wheels such as 300. However, in order to get the car off the track, it is necessary to have any transversely operating wheels engage the ground on the field side of the rail as close as possible to the rail wheels such as 300, and yet sufficiently far away from the rail 300 so that only a moderate amount of lifting will be necessary in order to clear the flanges such as 304 when the car is moved to the right.

Figure 7:
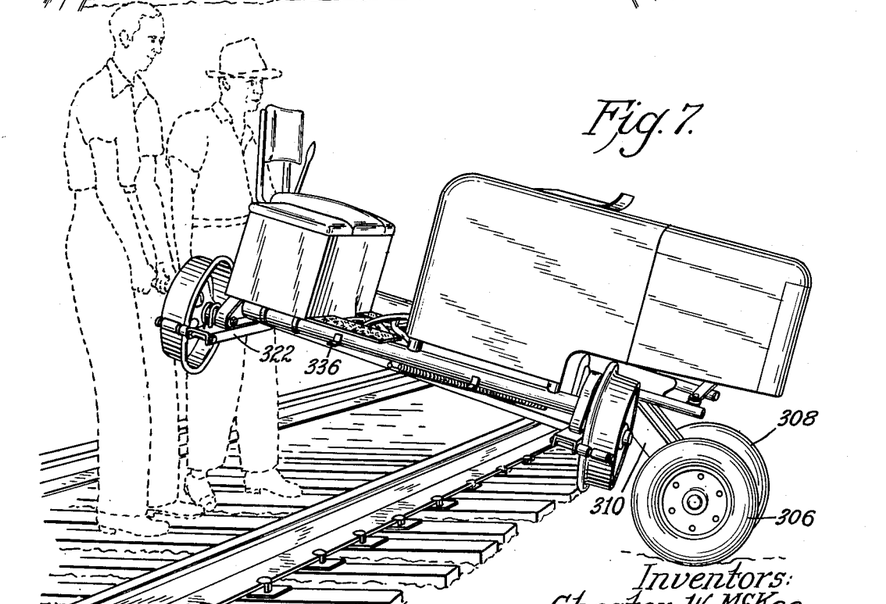
Figure 7 is a perspective view of the car being removed from a track.

This relationship of the ground wheels, identified by numerals 306 and 308 is illustrated in Figures 6 and 7. The wheels 306 and 308 are rotatably mounted on the outer ends of a pair of arms such as 310, which are pivoted on their inner ends on the frame. The length of the arm is such that it may be moved downwardly into a position such as 312. As it moves downwardly, the farther it moves, the more it gets under the center of weight of a car. How far down it can move will of course depend upon how quickly it engages the rail ballast or tie. This will depend primarily upon the height of the rail for ordinarily the ballast is almost level with the top of the ties. It is necessary, however, that it be possible to bring the bottom of the wheels 306 and 308 several inches below the bottom of any rail. As illustrated in Figure 7, the men are lifting the car at a time when the weight is concentrated well forward. A pair of handles which coact with the wheels 306 and 308 and which bear numbers 312 and 314, see Figure 5, extend well beyond the side of the car so as to give additional lifting leverage.

Referring again to Figure 5, the instrument panel 72 is positioned upright at the rear of the work table 114 (see also Figure 6). Beneath the work table 114 is the amplification unit including the cathode ray tube 316, which at the present stage of development is used either for checking the sensitivity of the amplification system or in connection with analyzing. A door pivoted at its lower edges may be dropped downward to make accessible the amplifier or the drive equipment for the tape unit. The door is shown in open position in Figure 5.

It will be noted that the operator has a seat 318 from which he can direct all necessary functions of the car. This arrangement is important. In the Frickey and McKee apparatus, one man operated the power car while another man did the checking with the cathode ray tube and a third man sat at the rear and studied the rail and the tape. There were interconnecting phones. The system was very cumbersome. It was necessary constantly to report to one another whether or not the car was proceeding at a proper speed, whether a signal came from a burn, shell or flow or from some non-visual defect. There were many other causes of constant conversation over the telephone system with the result that as a practical matter, testing was slow. In the present car, a single mind performs all the mechanical functions of starting, stopping, maintaining proper speed, functions which become semi-automatic. For example, in starting the present car, the gas engine will be running. The operator closes the main breaker switch 118, sets the high-low speed switch 102 at low and closes the forward and reverse switch 86. The car starts and within three or four feet is at normal speed, at which time the operator closes the magnet switch 130. As soon as these mechanical movements are performed, he can put his mind on the tape, glancing occasionally at the rail, and work efficiently with a single helper walking on the field side of the far-rail which is being tested. If a decision is reached to check a signal, he reverses the position of the high-low speed switch 102, the reversing switch 86 and turns off the magnet switch 130. With these three simple movements, the car starts in the other direction. A hand brake 320 is generally used in stopping. It is expected that this hand brake will be replaced by a hydraulic brake possibly run off of the electric compressor and the control will be on the work table.

Referring to Figure 6, the heavy cables 244 and 248 at the end of which are attached the hand check shoes 246 and 254, lie in a recess in the floor. It is self-evident that the shoes may be brought out and connected to either rail on either side of the car.

Attention is also directed to the method of mounting the magnet 136 on the car. Referring to Figure 6, extending forwardly at each corner of the frame is a member 322 which carries a horizontally disposed stud 324 having a pair of spaced annular grooves 326 and 328. The rear side of the casing 330 carries an upwardly directed hook member having spaced plates for engaging the grooves 326 and 328, see Figure 5. Returning to Figure 6, parallelism of the magnet 132 with the rail is maintained by means of an arm 334 which has hook ends to insert in holes on brackets 336 and 338 on the car and magnet respectively. By simply removing the magnet arm 324, referring to Figure 5, canting upwardly the outer end of the arm 326, the magnet may be disconnected from the car and positioned at any other desirable place and may be able to check either rail in any direction.

Figure 8:
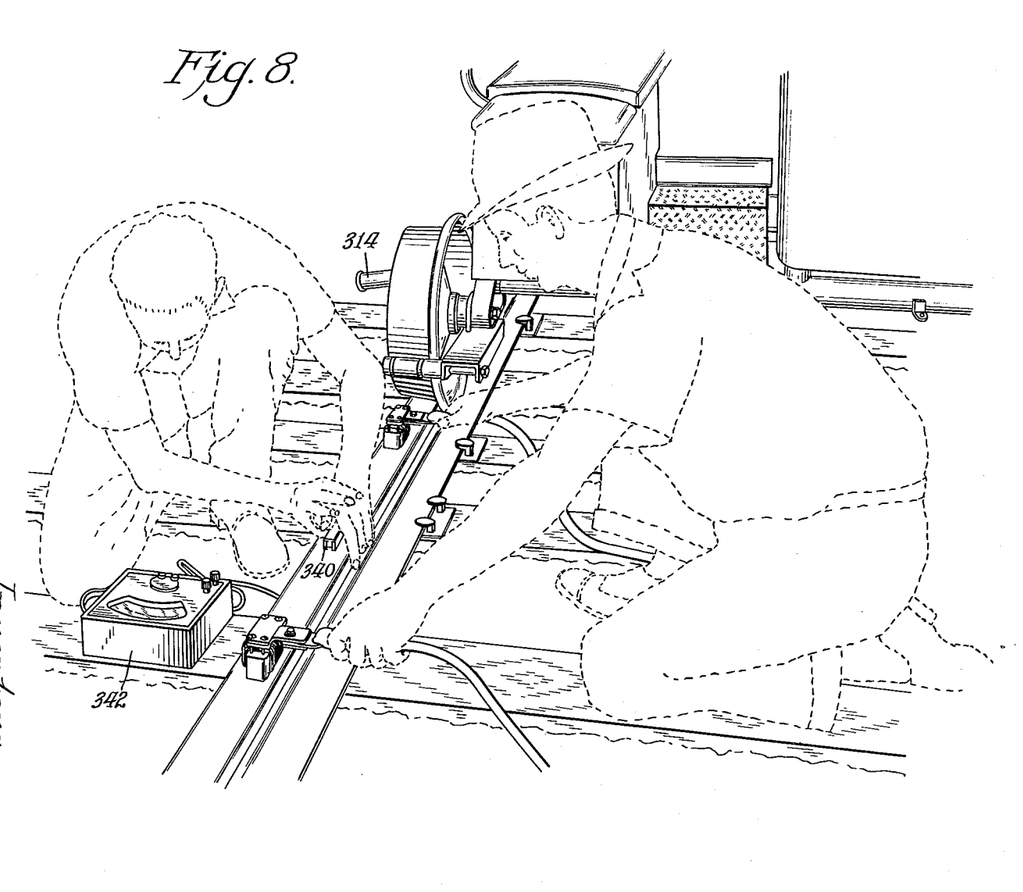
Figure 8 is a perspective view illustrating the ease of performing the hand check operation.

Returning now to the convenience of the hand check cables 244 and 246, referring to Figure 6, the check will always be made on that side of the car opposite to the side carrying the magnet, because that will be the trailing side. Figure 8 is a perspective view traced from a photograph showing the performance of the hand check operation. The numeral 340 identifies the conventional tester which has a pair of spaced poles connected to a potentiometer 342 and which is moved along the rail manually to detect a current drop caused by the presence of an internal fissure. This hand checking stop continues to be an unavoidable necessity before instructing the railroad to remove a rail. The more easily it can be performed, the more efficient will the flaw detector car be.

*The magnet*

The success of applicants' portable rail flaw detector is attributed in no small part to the effectiveness of its magnet in producing a residual sustained field. Prior to laying out this magnet on paper, applicants gave considerable attention to the statements found in Brace Patent No. 2,221,570 relative to the importance of having at least three poles against the magnetizeable object that is being moved by them for testing and of having the middle pole of opposite polarity to the two outer poles, and concluded that this constituted a mild form of growling the object. The thought was that the first two poles gave oscillating movements of the molecules in the rail ball and the last pole simply gave a set to the molecules. If this thinking had any merit, it was thought that it might be desirable to mount the poles rather close together.

Referring now to Figures 9 and 10, 344 and 346 are a pair of aluminum bars maintained in spaced relationship by means of four sets of independently rotatable, roller bearing wheels such as 348 and 350, with necessary shafts and locking means. Vertically disposed between said bars 344 and 346 and between two sets of rollers at each end are iron cores 352 and 354. Mounted on the lower end of each is a wedged shaped member 356 or 358 which is of conductive metal, and which has an elongated horizontal flux transmitting face such as 360.

Figure 9:
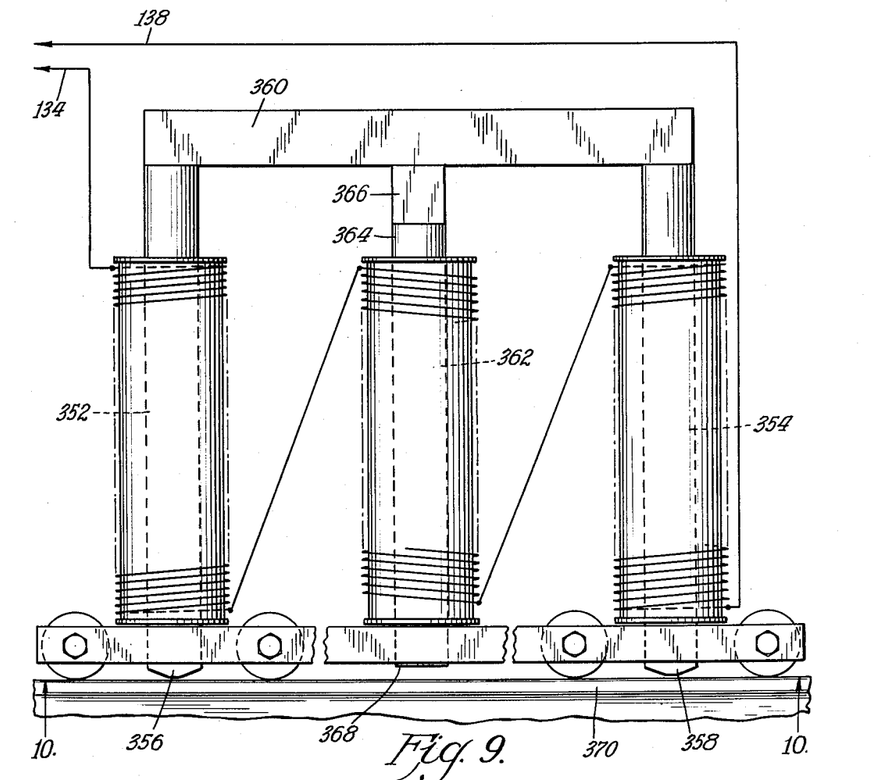
Figure 9 is a side view of the rail magnet with the casing removed.
Figure 10:
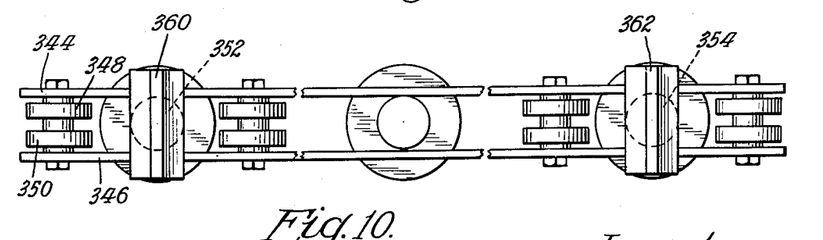
Figure 10 is a bottom view of the rail magnet.

The upper ends are joined together by a top bar of iron 360 so that in substance the magnet appears to be an ordinary inverted U-shaped magnet. The two cores 352 and 354 are spaced apart by approximately eleven inches.

Disposed intermediate to core members 352 and 354 is a similar core member 362 of the same cross dimension and same material, excepting that this member has its upper end 364 mounted on a two-inch brass, right parallelogram 366 so that there will be no direct flow of flux through metal from the top bar 360 to the middle core member 362. Attention is also called to the fact that the lower end 368 is spaced from the ball 370 of the rail by a much greater distance than are the pole pieces on the two outside core members 352 and 354. In fact, the spacing of the central core member 362 is approximately three-eighths of an inch while the spacing on the end members is one-sixteenth of an inch. This will be commented upon shortly.

The three core members 352, 362 and 354 are wound in series with identical windings on the outside core members 352 and 354 and an opposed winding on the central core member 362. Expressed differently, the central core member 362 is wound in series opposition to the two outside core members. The coils are wound for 115 volts D. C. with a power consumption of approximately 400 watts. The leads are indicated by the conductors 134 and 138 which bear the same numbers on the wiring diagram, Figure 4.

The spacing of the upper member of the intermediate core member 362 from the top bar 360 and the spacing of its lower end 368 from the rail ball are a result of experiment. The experiments were performed with the magnetometer while the magnet was both stationary and moving and it was found that the spacing described gave the best results. It is appreciated that many factors enter into the relationship of the parts of this magnet. Prominent among these is the magnet's capacity and the capacity of the generator, the size of the rail ball that is being tested, and the particular materials used in the magnet and the magnet frame. It is thought, however, that the greater spacing of the intermediate core member from the rail ball than the spacing of the two outside core members is important and that the spacing of the upper end of the intermediate core member 362 from the top bar 360 by a non-conductor is important. The reduced conductivity for flux of the core member 362 may have a tendency to force flux on both sides of the magnet so that there is an increased flow of flux from the lateral sustained fields through the air to the bar 360 in the central position of which above the core 364 there must be a great complexity of molecular polarity.

As actually built, the poles 356 and 358 are north poles and the pole 368 is a south pole, and the leads off the flux responsive pick-up are connected accordingly. It is not material, however, that these poles have this named polarity, for the apparatus would work equally well, it is at present believed, if the two outer poles, 356 and 358, were south poles and the intermediate pole 368 was a north pole, the leads from the pick-up 168 would of course have to be reversed.

This magnet gives the lateral sustained field on either side of the outside pole pieces 356 and 358 mentioned in experiment 2 in the introductory part of the disclosure. Assuming that the magnet is moved to the right, applicants refer to the sustained field which follows the pole 356 for a distance measurable by the magnetometer up to about six feet as the trailing sustained field. Applicants are confident although experiment has not yet been made, that, assuming the same directional movement of the magnet, the pick-up could be mounted in advance of the pole 358 and would find there a sustained field. This is called the leading sustained field. It is not thought that testing in the leading sustained field would be as effective as testing in the residual or trailing sustained field, for the reason that there would not have been the beneficial oscillation of the molecules to negative pre-testing magnetic fields around the rails that there has been when the testing is done in the trailing sustained field.

On the other hand, Experiment 3 above shows that the trailing sustained field has a definite damping effect upon flux fields created by surface defects and the question arises as to whether or not there will be any appreicable flux fields around surface defects where the flux field is being created by movements of the molecules inside the rail ball in advance of the leading pole 358. It may be that the flux in the leading sustained field around the rail comes primarily from within the ball, in which event strong flux fields around internal fissures might be generated without surface defects producing strong fields.

Experiments with the positioning of the pick-up show that it is quite effective at any point up to four feet behind the magnet. At the present time, referring to Figure 5, the distance is some thirty inches.

For additional information on applicants' magnet and the creation of a leading or trailing sustained field, see copending application Serial No. 749,166, filed May 20, 1947.

The triple pick-up

The triple pick-up will not be described in detail in this application. Its primary purpose is to assist the operator in accurately attributing a signal produced by the main pick-up 50 to a surface defect in the rail such as a burn, shell or flow. Each pick-up is connected through its own amplification system to its own pen and the three pens will be writing side-by-side on the same tape. An example of its usefulness will best explain its purpose. Various portions of rail possess an excessive number of burns, shells or flows. Thus, in the two or three hundred feet in front of a block signal or at a point where a siding turns into the main line of a single track right of way, there will be a large number of burns in the rails. It is important that fissures in these rails be located, but with the tape pen unit giving a non-informative signal for every burn, it is very difficult to detect fissures very fast. The pick-ups 52 and 54 will be wound either with or without an iron core for the purpose of being particularly sensitive to surface defects. Inasmuch as the burns are not located directly over the center of the rail, the actuation of just one will be helpful to an operator in electing not to make the hand check.

This advantage is further felt in the case of flows on the outside of the rail and shells on the gauge side.

The pick-up

Figure 12:
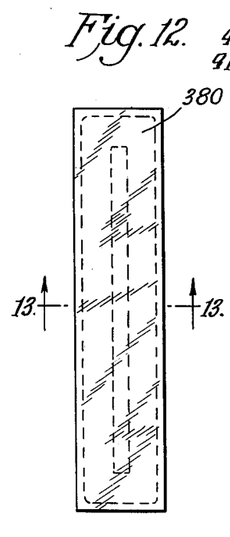
Figure 12 is a plan view of the principal air coil pick-up.
Figures 13, 14:
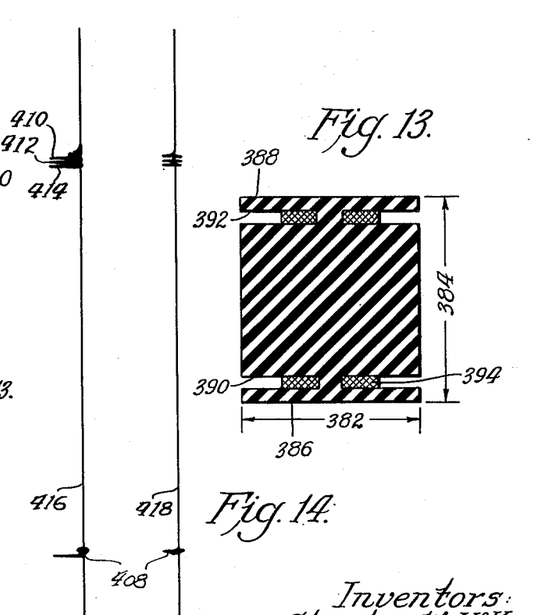
Figure 13 is a view taken on the line 13—13 of Figure 12.
Figure 14 is a full-size reproduction of a portion of a tape showing two fissures inside a rail joint.

Applicants are employing what is thought to be an improved pick-up. Referring to Figures 12 and 13, the core of the pick-up is designated by the numeral 380 and consists of a rectangular parallelogram having a long dimension sufficient to span both sides of the rail and having a width dimension 382 of seven eighths of an inch and a height 384 of one and one-eighth inches. One-sixteenth of an inch from the magnetizeable side 386 and a like distance from the upper side 388 are cut slots 390 and 392. These slots have a height of one-sixteenth of an inch. In these slots are wound about one thousand turns of wire so that the thickness of the wire in the lower coil 394 is about three-sixteenths of an inch. The two coils are connected in series opposition in the fashion disclosed in the Frickey and McKee Patent No. 2,388,683.

This coil is believed to have two advantages. So far as the lower coil 394 is concerned, more windings are brought close to the surface of the rail and it is believed that the lower coil is more sensitive to flux fields around the rail. The upper coil 396 has the same number of turns, and it is believed that by being positioned at a much greater distance above the rail than the distance employed in the Frickey and McKee pick-up, that it performs about the same function in negativing signals derived by the lower coil 394 due to movements of the coil at right angles to the rail ball as did the Frickey and McKee coil, but it helps negativing false signals produced by other parts of the apparatus.

The hand take-off

Figure 11:
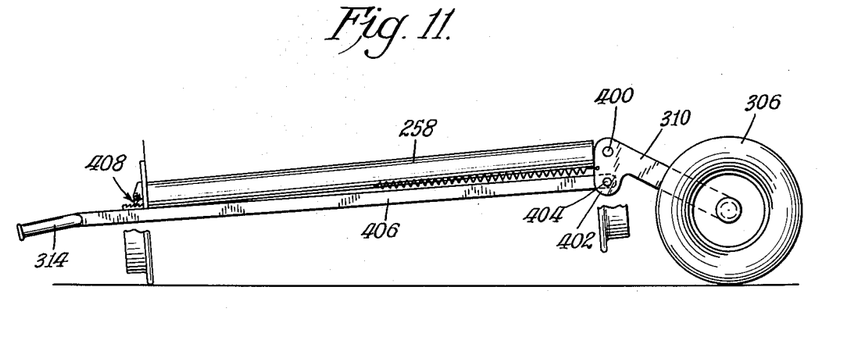
Figure 11 is a side view of the track unloading mechanism.

The hand take-off is illustrated in Figure 11, where 258 identifies the frame member and 310 one of the arms for supporting the wheels such as 306. The arm 310 is pivoted at 400 to the frame. From an off-set portion 402 is pivotally connected at 404 an arm 406 having a handle 314. There is a similar arm for the arm corresponding to 310, see Figure 5. By gripping the handles such as 314 and 312, and pulling to the left, the wheels 306 will be drawn downwardly until they engage either a rail tie or the track ballast. By lifting on the handles 312 and 314, the weight of the flaw detector car will hold the arms such as 406 and the wheels 306 in lower position. When, however, the car is positioned on a track or an automobile trailer, the handles 312 and 314 are pushed inwardly of the car so as to raise the wheels such as 306, and the apparatus is held in retracted position by means of a dog and ratchet assembly indicated by the numeral 408.

The hand check generator

A four hundred ampere generator operating at one volt continuously would require conductors of such cross section as to make the generator weigh from 125 pounds up. Applicants' D. C. generator is designed to employ conductors having the smallest cross-section consistent with operating the generator for a period of time of two or three minutes. An ordinary hand check can be performed in about one minute while two minutes is almost the maximum. The thought was to select as light conductors as possible, to insulate them with glass and mica, and to silver solder all connections, which will produce a circuit capable of withstanding a temperature of 1100 degrees F. and which will not reach this temperature until three minutes of operation. Hand checks are performed at infrequent intervals so that the temperature of the overloaded generator after the hand check has a considerable length of time to drop back to atmospheric temperature.

Operation

The effectiveness of this detector car is demonstrated in Figure 14 which shows two pen recordings on a tape, which pens are both operated on the same output of applicants' amplifier, but have slightly different biases. The numeral 408 identifies the recordings of the two pens of a rail joint. Before reaching the next rail joint 410, both pens wrote two signals such as 414 and 412. The sources of both of these signals 412 and 414 were inside the rail joint bars, 414 being a break in the rail and 412 an internal, transverse fissure.

Having thus described our invention, what we claim as new and wish to secure by United States Letters Patent is:

1. A fissure detector car comprising a frame, wheels mounted on said frame for supporting it on a track, means connected to said frame and positioned adjacent to a supporting rail for creating a lateral sustained magnetic field on each side thereof, a non-magnetic core coil positioned in one of said lateral sustained fields at a fixed distance from said magnetizing means, and means responsive to said coil for visibly presenting potential signals generated therein.

2. A fissure detector car comprising a frame, wheels mounted on said frame for supporting it on a track, means mounted on said frame and positioned adjacent to a supporting rail for creating a lateral sustained magnetic field on each side thereof, a non-magnetic core coil having its axis vertically positioned with respect to the top of the rail positioned in one of said lateral sustained fields at a fixed distance from said magnetizing means, and means responsive to said coil for visibly presenting potential signals generated therein.

3. A fissure detector car comprising a frame, wheels mounted on said frame for supporting it on a track, means mounted on said frame and positioned adjacent to a supporting rail for creating a lateral sustained magnetic field on each side thereof, a non-magnetic core coil having a dimension extending longitudinally of the rail of less than one inch positioned in one of said lateral sustained fields at a fixed distance from said magnetizing means, and means responsive to said coil for visibly presenting potential signals generated therein.

4. A fissure detector car comprising a frame, wheels mounted on said frame for supporting it on a track, means mounted on said frame and positioned adjacent to a supporting rail for creating a lateral sustained magnetic field on each side thereof, a non-magnetic core coil positioned with its axis vertical to the ball of the rail and having a similar non-magnetic core coil positioned thereabove and connected in series opposition thereto and both positioned in one of said lateral sustained fields, said coils being positioned at a fixed distance from the magnetizing means, and means responsive to said coils for visibly presenting potential signals generated therein.

5. A fissure detector car comprising a frame, wheels at least one of which is made of non-magnetic material mounted on said frame for supporting it on a track, means for magnetizing a rail mounted on said frame adjacent said non-magnetic wheel so as to create a trailing sustained magnetic field on both sides of said wheel, a flux responsive means mounted on the other side of said wheel in said trailing sustained field at a fixed distance from the magnetizing means, and means responsive to the flux responsive means for visibly presenting potential signals generated in the flux responsive means.

6. A fissure detector car comprising a frame, wheels mounted on said frame for supporting it on a track, three magnetized cores substantially aligned along one rail, said cores being positioned sufficiently close together so that their magnetic fields will affect each other, said magnetized cores each having a pole adjacent the rail with the polarity of any two adjoining cores reversed with respect to each other, a pick-up positioned substantially in longitudinal alignment with said pole members but at one side thereof so as to be within a lateral sustained field created thereby, and means responsive to the pick-up for visibly presenting potential signals generated in the pick-up by flux fields adjacent the rail.

7. A fissure detector car comprising a frame, wheels mounted on said frame for supporting it on a track, a U-shaped core member having the ends of its arms positioned adjacent the ball of a rail and mounted on the frame so as to move longitudinally of the rail along with the car, windings on said core such as to give the two arm ends the same polarity, a magnetized core positioned so that one pole is adjacent the rail ball at a point between the two like polarity poles of the U-shaped member, whereby there will be a flow of flux between the two arms and the intermediate core via the rail, a pick-up positioned to one side of and sufficiently close to one of the arms of the U-shaped member as to be within the lateral sustained field thereof, and means responsive to the pick-up for visibly presenting potential signals generated in the pick-up by flux fields adjacent the rail.

8. A fissure detector car comprising a frame, wheels mounted on said frame for supporting it on a track, an inverted U-shaped magnetic core positioned with its depending poles adjacent the ball of a rail and in longitudinal alignment therewith, electric energization means associated with each arm of said magnetic core for giving to the arm ends a like polarity, an upright elongated core positioned between said arms and in alignment therewith so that one end is adjacent the rail ball, electric energization means for giving to the depending end of the intermediate core a polarity opposite to the polarity of the arm ends, a pick-up positioned to one side of and sufficiently close to one of said arms and in longitudinal alignment therewith to be within its lateral sustained field in the rail created by the magnet, and means responsive to the pick-up for visibly presenting potential signals generated in the pick-up by flux fields adjacent the rail.

9. A fissure detector car comprising a frame, wheels mounted on said frame for supporting it on a track, an inverted U-shaped magnetic core positioned with its depending poles adjacent the ball of a rail and in longitudinal alignment therewith, electric energization means associated with each arm of said magnetic core for giving to the arm ends a like polarity, an upright elongated core positioned between said arms and in alignment therewith so that no one end is adjacent the rail ball, electric energization means for giving to the depending end of the intermediate core a polarity opposite to the polarity of the arm ends, said intermediate member having a nonconductive gap between its upper end and the top of the U-shaped magnet, a pick-up positioned to one side of and sufficiently close to one of said arms and in longitudinal alignment therewith to be within its lateral sustained field in the rail created by the magnet, and means responsive to the pick-up for visibly presenting potential signals generated in the pick-up by flux fields adjacent the rail.

10. A fissure detector car comprising a frame, wheels mounted on said frame for supporting it on a track, an inverted U-shaped magnetic core positioned with its depending poles adjacent the ball of a rail and in longitudinal alignment therewith, electric energization means associated with each arm of said magnetic core for giving to the arm ends a like polarity, an upright elongated core positioned between said arms and in alignment therewith so that one end is adjacent the rail ball, electric energization means for giving to the depending end of the intermediate core a polarity opposite to the polarity of the arm ends, said intermediate core having its outer end terminating at a point somewhat short of a line connecting the ends of the arms of the U-shaped member, a pick-up positioned to one side of and sufficiently close to one of said arms and in longitudinal alignment therewith to be within its lateral sustained field in the rail created by the magnet, and means responsive to the pick-up for visibly presenting potential signals generated in the pick-up by flux fields adjacent the rail.

11. A fissure detector car comprising a frame, wheels mounted on said frame for supporting it on a track, a pick-up suspended from said frame so as to be adjacent a rail, means responsive to the pick-up for visibly presenting potential signals generated in the pick-up from the flux fields adjacent the rail, an elongated carriage guidably connected to said frame so as to extend longitudinally of a rail, three pole pieces mounted on said carriage so as to be adjacent to the rail ball, each adjacent pole piece being of opposite polarity, and supporting wheels mounted on each side of each end pole member and engageable with the surface of the rail, said carriage being positioned sufficiently close to the pick-up so that the pick-up will be within a lateral sustained field created by the poles when the same are energized.

12. The method of detecting fissures in rails which comprises the steps of creating a flux circuit from one pole of a magnet into the rail and thence out of the rail through the air thereabove to the other pole of the magnet so as to create at that point above the rail a lateral sustained field, of flux running from the rail upwardly to the other pole piece, and of recording differences in the direction and intensity of the flux in said lateral sustained field only by a flux responsive means positioned therein.

13. The method of detecting fissures in rails which comprises the steps of creating a flux circuit from one pole of a magnet into the rail and thence out of the rail through the air thereabove to the other pole of the magnet so as to create at that point above the rail a lateral sustained field of flux running from the rail upwardly to the other pole piece, and of recording differences in the direction and intensity of the flux in said lateral sustained field by a nonmagnetic core coil positioned therein.

14. A fissure detector car comprising a frame, wheels mounted on said frame for supporting it on a track, means connected to said frame and positioned adjacent to a supporting rail for creating a trailing sustained magnetic field on each side thereof, a non-magnetic core coil positioned in said trailing sustained field at a fixed distance from said magnetizing means, and means responsive to said coil for visibly presenting potential signals generated therein.

CHESTER W. McKEE.
RICHARD W. McKEE.

REFERENCES CITED

The following references are of record in the file of this patent:

UNITED STATES PATENTS

| Number | Name | Date |
|---|---|---|
| Re. 21,927 | Brace et al. | Oct. 21, 1941 |
| 1,132,016 | Jobke | Mar. 16, 1915 |
| 1,944,930 | Drake | Jan. 30, 1934 |
| 2,031,469 | Drake | Feb. 18, 1936 |
| 2,109,455 | Barnes et al. | Mar. 1, 1938 |
| 2,150,922 | Hay | Mar. 21, 1939 |
| 2,185,589 | Drake et al. | Jan. 2, 1940 |
| 2,276,011 | Billstein | Mar. 10, 1942 |
| 2,297,879 | Drake | Oct. 6, 1942 |
| 2,311,715 | Thorne | Feb. 23, 1943 |
| 2,313,729 | Barnes | Mar. 16, 1943 |
| 2,317,721 | Barnes | Apr. 27, 1943 |
| 2,388,683 | Frickey | Nov. 13, 1945 |
| 2,392,168 | Mages | Jan. 1, 1946 |
| 2,425,857 | Barnes et al. | Aug. 19, 1947 |